US009130787B2

(12) United States Patent
Hewavithana et al.

(10) Patent No.: US 9,130,787 B2
(45) Date of Patent: Sep. 8, 2015

(54) ADAPTIVE FREQUENCY-DOMAIN EQUALIZATION FOR WIRELESS RECEIVERS

(75) Inventors: Thushara Hewavithana, Borehamwood (GB); Bernard Arambepola, Middlesex (GB); Sahan S. Gamage, Hardwick (GB); Parveen K. Shukla, Nottingham (GB)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/185,091

(22) Filed: Jul. 18, 2011

(65) Prior Publication Data

US 2013/0022097 A1 Jan. 24, 2013

(51) Int. Cl.
*H04B 1/00* (2006.01)
*H04L 25/02* (2006.01)
*H04L 25/03* (2006.01)
*H04L 1/00* (2006.01)

(52) U.S. Cl.
CPC ............... *H04L 25/022* (2013.01); *H04L 1/005* (2013.01); *H04L 25/025* (2013.01); *H04L 25/03159* (2013.01); *H04L 2025/0342* (2013.01); *H04L 2025/03382* (2013.01)

(58) Field of Classification Search
CPC ................ H04L 25/022; H04L 25/025; H04L 25/03159; H04L 12/282; G11B 20/10055; G11B 20/10009; H04H 20/81
USPC ........... 375/142, 13, 144, 148, 150, 152, 316, 375/343, 346, 350; 455/63.1, 114.2, 278.1, 455/296
See application file for complete search history.

(56) References Cited

U.S. PATENT DOCUMENTS

| | | | | |
|---|---|---|---|---|
| 5,537,443 | A * | 7/1996 | Yoshino et al. | 375/340 |
| 7,680,218 | B2 * | 3/2010 | Wilhelmsson et al. | 375/340 |
| 2006/0018389 | A1 * | 1/2006 | Koorapaty et al. | 375/259 |
| 2007/0110201 | A1 * | 5/2007 | Mergen et al. | 375/350 |
| 2009/0116581 | A1 * | 5/2009 | Liau | 375/296 |
| 2009/0122854 | A1 * | 5/2009 | Zhu et al. | 375/232 |
| 2011/0243280 | A1 * | 10/2011 | Hayashi | 375/340 |
| 2012/0314750 | A1 * | 12/2012 | Mehrabani | 375/229 |

OTHER PUBLICATIONS

Xie et al. (Gang Xie et al., "Simplified and Adaptive Prediction Algorithm of Time-varying Wideband Channels", 2006, IEEE, total of 4 pages).*
Hong Liu et al., "Frequency Domain Turbo Equalization for Vestigial Sideband Modulation with Punctured Trellis Coding", IEEE 7th Workshop on Signal Processing Advances in Wireless Communications, 2006, SPAWC '06, total of 5 sheets.
Marcus Grossmann et al., "Nonlinear Frequency Domain MMSE Turbo Equalization using Probabilistic Data Association", IEEE Communications Letters, vol. 12, No. 4, Apr. 2008, pp. 295-297.

* cited by examiner

*Primary Examiner* — Syed Haider
*Assistant Examiner* — Fabricio R Murillo Garcia
(74) *Attorney, Agent, or Firm* — Pillsbury Winthrop Shaw Pittman LLP

(57) ABSTRACT

According to various embodiments, devices and methods disclosed herein include performing, using a processor, a linear operation on a first plurality of channel frequency responses and a plurality of corresponding predictor coefficients to estimate a new channel frequency response. Each of the plurality of corresponding predictor coefficients may be updated based on an error value and a second plurality of channel frequency responses to obtain an updated predictor coefficient. The error value may be computed based on an estimated current channel frequency response and a predicted current channel frequency response. The new channel frequency response may be used to equalize a received modulated signal including a single-carrier modulated signal, e.g., a signal modulated using a vestigial sideband modulation scheme, or a quadrature amplitude modulation scheme.

23 Claims, 2 Drawing Sheets

ADAPTIVE FREQUENCY-DOMAIN EQUALIZATION FOR WIRELESS RECEIVERS

FIELD

This disclosure relates generally to wireless communication and, more particularly, to techniques to estimate a channel frequency response for use in equalization in single-carrier wireless systems.

BACKGROUND

The advanced television systems committee (ATSC) standard used for terrestrial digital television (DTV) is based on single-carrier VSB modulation. ATSC mobile/handheld (ATSC M/H) standard is a mobile/handheld variant of the ATSC standard. The digital multimedia broadcast-terrestrial/handheld (DMB-T/H) standard is another DTV standard that uses single-carrier modulation technique. Time-domain algorithms used in conventional DTV receivers may be very computation intensive because of their complex equalizers implementations. Accordingly, the time-domain demodulation algorithms may not be feasible implementation based on (or using) programmable processors. However, frequency-domain demodulation is considered as a viable way of implementing receivers, e.g., using programmable processors, for one or more of the above DTV standards.

Conventionally, the signals received at DTV receivers (ATSC, DMB, or any other receiver) suffer from multi-path or echo interference. Accordingly, to mitigate such interference, the DTV receivers may be configured to perform channel equalization. However, multi-path profiles of the signals handled by the DTV receivers (particularly, the mobile receivers) may be time-varying, and as such, the receivers may need to be designed and configured to handle dynamic channel equalization.

Frequency-domain implementation of the DTV receivers (and equalizers therein) work on blocks of samples or data. The block sizes may be selected relatively large to achieve the computational gains (e.g., in computing Fourier transforms, and other operations) needed for real-time implementation in software. However, as a result of such large block sizes, the equalizers may not be able to adapt the channel frequency response fast enough to be able to efficiently equalize time-varying channels and accurately recover the transmitted signal. Additionally, conventional equalizer or DTV receiver implementations may only consider one previous channel frequency response estimate to obtain a new channel frequency response (for a new data block). As such, those implementations fail to consider an extended history of channel frequency responses, and do not exploit the statistical properties of the time-varying channel to obtain an accurate estimate of a new channel frequency response.

DETAILED DESCRIPTION

Figure 1:
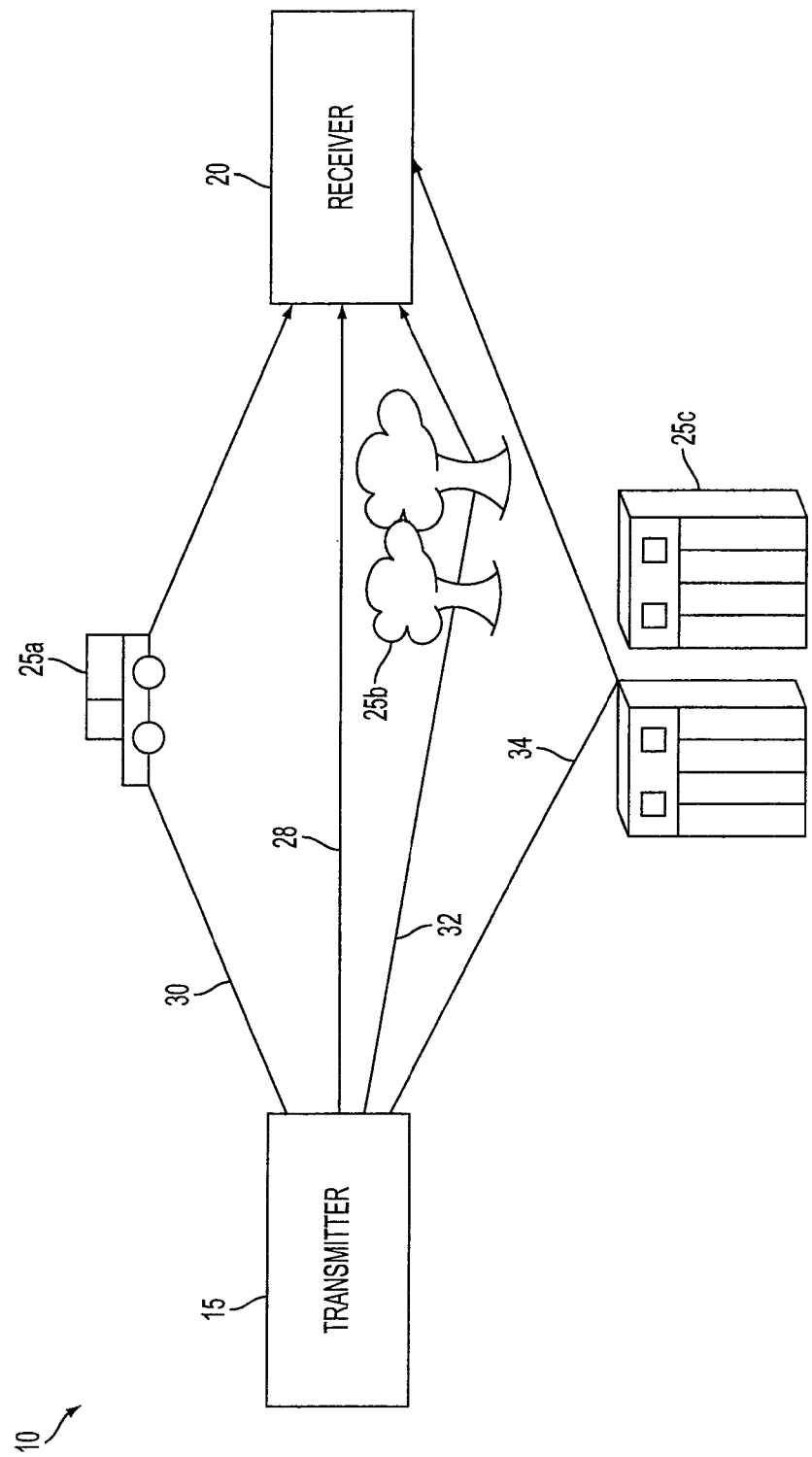
FIG. 1 depicts an example of wireless communication between a transmitter and a receiver.

In the description that follows, like components have been given the same reference numerals, regardless of whether they are shown in different aspects. To illustrate one or more aspect(s) of the present disclosure in a clear and concise manner, the drawings may not necessarily be to scale and certain features may be shown in somewhat schematic form. Features that are described and/or illustrated with respect to one aspect may be used in the same way or in a similar way in one or more other aspects and/or in combination with or instead of the features of the other aspects of the technology disclosed herein.

SUMMARY

In accordance with various embodiments of the present disclosure, the problem of lack of adaptability with time-varying channels in channel frequency response-estimation techniques is addressed by considering a plurality of past channel frequency responses to predict a new channel frequency response. Moreover, prediction coefficients corresponding to the plurality of past channel frequency responses are updated based on an adaptive algorithm, such that the prediction coefficients adapt to the statistical properties of the time-varying channels.

In broad overview, systems, devices and methods in accordance with various embodiments of the present disclosure may be implemented in connection with wireless receivers, e.g., digital television (DTV) receivers, including, but not limited to, receivers based on advanced television systems committee (ATSC) standard, ATSC mobile/handheld (ATSC M/H) standard, or digital multimedia broadcast-terrestrial/handheld (DMB-T/H) standard. In some embodiments, the wireless receivers are configured to equalize and demodulate signals modulated (e.g., at a transmitter) using at least one of a plurality of single-carrier modulation schemes, such as vestigial sideband (VSB) modulation schemes, and quadrature amplitude modulation (QAM) schemes.

In accordance with various embodiments of the present disclosure, a method is disclosed that includes performing, e.g., using a processor, a linear operation on a first plurality of channel frequency responses and a plurality of corresponding predictor coefficients to estimate a new channel frequency response. The plurality of corresponding predictor coefficients may be stored in a memory.

The method may further include updating at least one of the plurality of corresponding predictor coefficients based on an error value to obtain an updated predictor coefficient. The error value may be computed based on an estimated current channel frequency response and a predicted current channel frequency response. In some embodiments, the operation of updating at least one of the plurality of corresponding predictor coefficients is further based on a second plurality of channel frequency responses. For example, the updating operation may include implementing an adaptive prediction algorithm, e.g., a normalized least mean square (LMS) algorithm, on the error value and the second plurality of channel frequency responses. In some embodiments, the at least one of the plurality of corresponding predictor coefficients is replaced with the updated predictor coefficient in the memory, and the operation of performing the linear operation is executed after the replacement of the predictor coefficient.

In some embodiments, the method further includes computing the predicted current channel frequency response based on the plurality of corresponding predictor coefficients and the second plurality of channel frequency responses. In some embodiments, the method further includes receiving a modulated signal at a receiver module, computing a decision signal using, e.g., an equalization algorithm executed on the received modulated signal, and computing the estimated current channel frequency response based on the received modulated signal and the decision signal. The received modulated signal may include a single-carrier modulated signal, wherein the single-carrier modulated signal may include a signal modulated using at least one of a plurality of single-carrier modulation schemes. The plurality of single-carrier modulation schemes may include, but not limited to, a vestigial sideband (VSB) modulation scheme, and a quadrature amplitude modulation (QAM) scheme.

In some embodiments, at least one of the first plurality of channel frequency responses or the second plurality of channel frequency responses includes temporally-successive channel frequency responses stored in a memory. Further, both the first plurality of channel frequency responses and the second plurality of channel frequency responses may include at least one common channel frequency response.

In accordance with various embodiments of the present disclosure, a device is disclosed that includes a linear prediction module configured to perform a linear operation on a first plurality of channel frequency responses and a plurality of corresponding predictor coefficients to estimate a new channel frequency response.

The device may further include a prediction error module configured to compute an error value based on an estimated current channel frequency response and a predicted current channel frequency response; and a predictor update module configured to update at least one of the plurality of corresponding predictor coefficients based on the error value to obtain an updated predictor coefficient. The predictor update module may be further configured to update the at least one of the plurality of corresponding predictor coefficients based on a second plurality of channel frequency responses.

In some embodiments, the device further includes a memory configured to store at least one of the first plurality of channel frequency responses, the second plurality of channel frequency responses, or the plurality of corresponding predictor coefficients. At least one of the first plurality of channel frequency responses or the second plurality of channel frequency responses may include temporally-successive channel frequency responses.

In some embodiments, the linear prediction module of the device is further configured to compute the predicted current channel frequency response based on the plurality of corresponding predictor coefficients and the second plurality of channel frequency responses.

In some embodiments, the device further includes a receiver module configured to receive a modulated signal; an equalization module configured to execute an equalization algorithm on the received modulated signal to generate an equalized signal; a decision module configured to compute a decision signal based on the equalized signal; and a channel response-estimation module configured to compute the estimated current channel frequency response based on the received modulated signal and the decision signal.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DESCRIPTION

FIG. 1 depicts a typical wireless transmission, e.g., in a DTV system 10 from a transmitter 15 to a receiver 20. DTV system 10 may be implemented based on one of a plurality of DTV standards including, but not limited to, ATSC standard, ATSC M/H standard, or DMB-T/H standard. Accordingly, transmitter 15 and/or receiver 20 may be configured to operate in system 10 in accordance with the standard used as the basis for DTV system 10. For example, transmitter 15 may be configured to modulate audio, video and/or other data signals using at least one of a plurality of single-carrier modulation schemes including, but not limited to, VSB modulation schemes and QAM modulation schemes. Similarly, receiver 20, which may be static or mobile, may be configured to demodulate signals received from transmitter 15 based on the demodulation scheme corresponding the modulation scheme used at transmitter 15. In some embodiments, receiver 20 includes, or may be implemented within a user-operated device. Examples of such a user-operated device may include, but not limited to, a cellular phone operational with system DTV system 10 as well as with a cellular phone network (not shown), a laptop, a smartphone, and other mobile and/or handheld devices capable of receiving, processing and/or rendering multimedia information. For simplicity, only one transmitter and receiver is illustrated, but it should be appreciated that the system and method of this disclosure are intended to apply to situations where there are multiple transmitters and/or receivers in DTV system 10.

As depicted in FIG. 1, because of reflection from objects 25 in the area and/or if the transmitter 15 and receiver 20 move relatively fast with respect to one another, the signal from transmitter 15 to receiver 20 may include multiple paths. In other words, the channel carrying the modulated signal from transmitter 15 to receiver 20 may include multiple paths, e.g., the most direct path 28 and additional paths 30, 32, 34. Each path may have associated with it a gain or attenuation ($h_0$, $h_1$, $h_2$, or $h_3$) and a phase shift ($m_0$, $m_1$, $m_2$, or $m_3$). The attenuation and/or phase shift of one or more of paths 28, 30, 32, 34 may vary in time, i.e., from one time instant to another, and as such, the channel including those paths may be considered as a time-varying channel that may be, e.g., modeled using random processes. Accordingly, multiple replicas, with different attenuations and different phase shifts, of the modulated signal are received at receiver 20. Additionally, there may be noise (e.g., additive white Gaussian noise, etc.) added to the signal during transmission. Accordingly, the signal received at receiver 20 may suffer from multipath propagation including fading (e.g., Rayleigh fading, etc.) and/or intersymbol interference (ISI), and additive noise. In some embodiments, the ISI noise in the received signal results in erroneous decoding or demodulation of the received signal, and as such an equalizer (e.g., as illustrated in FIG. 2 and described in detail below) may be used to mitigate or eliminate the ISI noise and accurately recover the transmitted signal.

Figure 2:
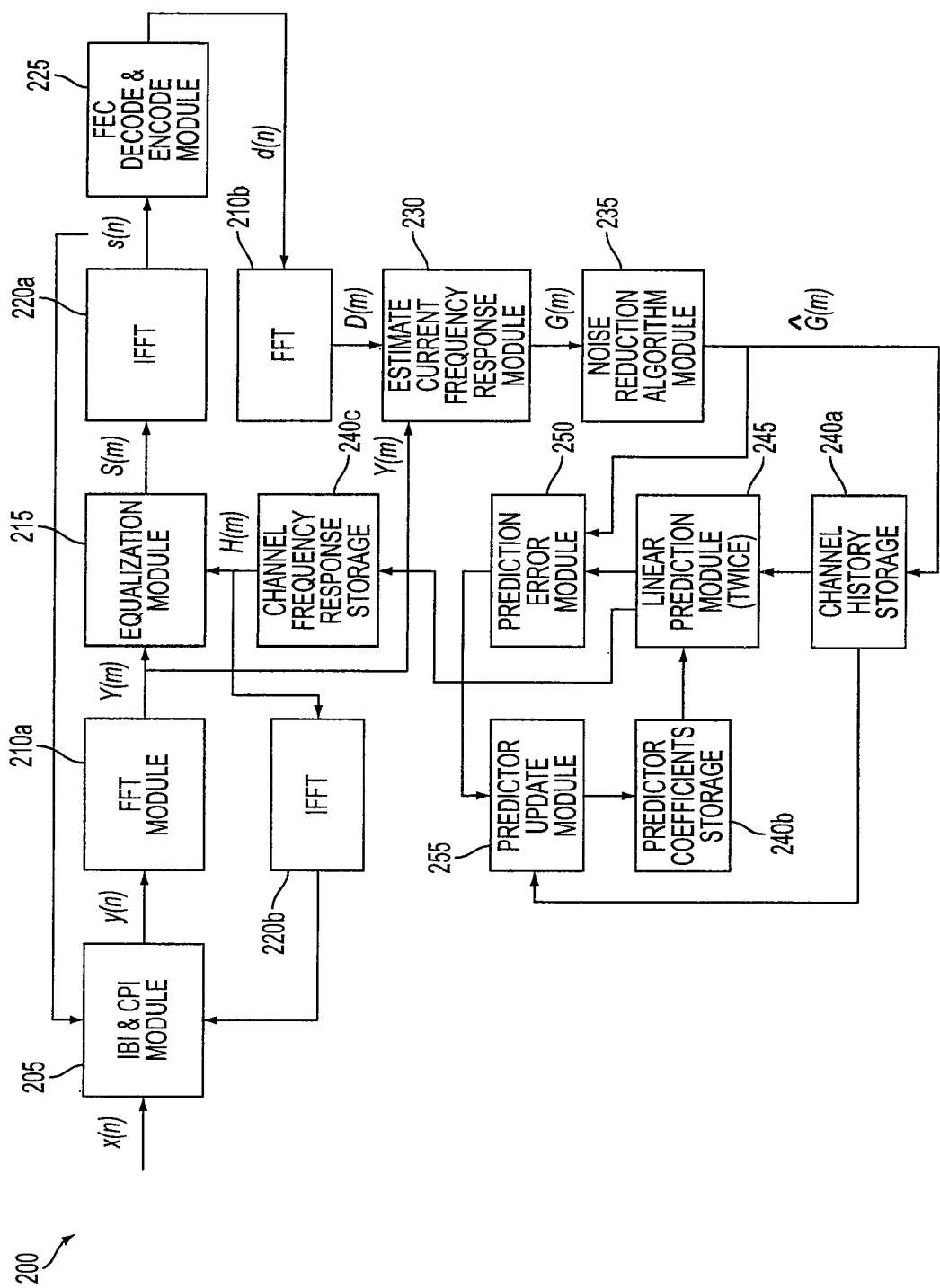
FIG. 2 is a block diagram of an exemplary device in accordance with various embodiments of the present disclosure.

FIG. 2 depicts an exemplary embodiment in form of system 200 configured to, among other functions, estimate channel frequency responses and implement frequency-domain equalization techniques in accordance with various aspects of this disclosure. System 200 may be implemented within, or may be operatively associated with receiver 20. As depicted, system 200 may include an inter-block interference cancellation and cyclic prefix insertion (IBI & CPI) module 205, fast Fourier transform (FFT) modules 210a, 210b, an equalization module 215, inverse fast Fourier transform (IFFT) modules 220a, 220b, a forward error correction (FEC) encode and decode module 225, a current channel response-estimation (CCRE) module 230, a noise reduction algorithm module 235, storages or memories 240a, 240b, 240c, a linear prediction module 245, a prediction error module 250, and a predictor update module 255. For clarity, resources and/or components of system 200 not required or related to channel frequency response-estimation or equalization operations are not shown in FIG. 2, but those resources/components will be appreciated by a person of ordinary skill in the art.

In one or more embodiments, one or more modules of the system 200, or other components that a module of system 200 may be connected with (not shown in figures) may include one or more processors and/or individual memory modules, to perform the functions and processes described herein. Also, although the modules in FIG. 2 are shown as individual components or elements, in one or more embodiments, those modules may be combined into one or more devices, one or more software programs, or one or more circuits on one or more chips. In some embodiments, some modules or components of system 200 may be part of a system which is located geographically remotely from the rest of the modules or components of system 200. In such a case, the remotely located groups of modules may be operatively connected with each other through a wired or wireless network (not shown) using necessary interfaces and components. Such network may include one or more of a private TCP/IP network, the Internet, or a private or public radio frequency (RF) network.

In some embodiments, one or more modules of system 200 are realized in one or more programmable devices such as a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Alternatively, or additionally, one or more modules of system 200 may be implemented in software stored on an article of manufacture (e.g., floppy disks, CDs, hard disks, flash drives, etc.) to enable a general-purpose processor to perform the specific functions described herein, or combination of hardware and software.

As would be understood by a person with skill in the art, the functional block diagram of FIG. 2 is presented merely an aid in understanding the various functions of system 200, and actual implementation of the desired functionality may be implemented by fewer or more functional modules. It must be understood that so long as the system performs all necessary functions, it is immaterial how they are distributed within the system and the programming or hardware architecture thereof.

In some embodiments, one or more storages or memories 240a, 240b, 240c are of one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Memories 240 may be capable of storing one or more quantities or data including, but not limited to, multiple previously-computed channel frequency responses, prediction coefficients to be used in a linear prediction operation, a newly-computed channel frequency responses, and any other data. Data stored in one or more of memories 240 may be used to perform the functions or operations described herein below.

In operation, in some embodiments, transmitted signal (e.g., from transmitter 15) is received at IBI & CPI module 205 of system 200 as a received signal x(n) which may be distorted and noisy due to, e.g., multipath interference. The index n denotes time index for the signal. In some embodiments, a signal x(n) may be received at system 200 as a series of blocks of data (in time-domain), and such blocks of data may be negatively impacted by inter-block interference during transmission. IBI & CPI module 205 may be configured to correct inter-block interference within the received signal x(n) by using equalized data, i.e., s(n−1), from the previous data block. In some embodiments, channel impulse response, h(n), needed to estimate IBI is computed based on current channel frequency response estimate (e.g., by computing inverse Fourier transform of channel frequency response, H). Cyclic prefix (CP) restoration may use an estimate of current block, s(n), to determine cyclic prefix contribution that is added to the beginning of IBI-cancelled block x(n) based on the current channel impulse response, h(n). The restoration may make signal y(n) (i.e., output of module 205) appear to be a cyclic convolution between s(n) and h(n). Accordingly, to implement CP restoration, at least two iterations through the equalization process (as discussed below) may be required. For example, in the first iteration, an estimate of s(n) may not be obtained, and therefore no CP restoration may be possible. Accordingly, a second iteration may be performed such that CP restoration is executed using an estimate of s(n) from the first iteration.

Each block of data of the signal y(n) may then be provided as an input to FFT module 210a for converting the block's data from the time domain to the frequency domain using a Fourier transform. Frequency-domain signal Y(m), where m denotes the frequency index, thus generated includes Fourier coefficients that correspond to the data symbols of the data block of the signal y(n) (which are to be equalized and decoded). In some embodiments, the size of the received data blocks (of, e.g., the signal y(n)), and therefore, the number of samples in a block provided as an input to FFT modules 210a, 210b to perform Fourier transform (or to IFFT modules 220a, 220b to compute inverse Fourier transform) may be selected based on a specific implementation of system 200. For example, if implemented in hardware, a larger block size, e.g., equal to 8000 samples in one data block, may be selected. Such large block size may result in increased computational complexity, which may be handled by the suitable hardware implementation.

On the other hand, if system 200 is implemented in software, it may be desired to implement the Fourier transforms (and inverse Fourier transforms) with relatively smaller complexity, and higher speed and efficiency. As such, for software implementation, a block size, e.g., equal to 2000 samples in one data block, that is smaller than the block size for hardware implementation may be selected. Additionally, or alternatively, the block size may be selected based on the maximum echo delay of the multipath transmission channel between transmitter 15 and receiver 20. Further, the block size may be selected based on the mobility characteristics of receiver 20, and therefore, system 200, which may be indicative of the rate of change of the characteristics of the time-varying channel. For example, if receiver 20 is substantially stationary, or moving at a slow speed of, e.g., 5 miles per hour, a larger block size of, e.g., 8000 samples per data block, may be selected. And, if receiver 20 is moving at a higher speed, a smaller block size of, e.g., 2000 samples per data block, may be selected. Further, although FFT modules 210a, 210b (or IFFT modules 220a, 220b) are described as using fast Fourier transform techniques to compute a Fourier transform (or inverse Fourier transform), any other technique to compute discrete Fourier transform (DFT) may be used.

One block of the frequency-domain signal Y(m) is fed as an input to equalization module 215 which may also receive an estimated channel frequency response H(m) (also in the frequency domain) from memory or storage 240c at its input. The technique used to estimate the channel frequency response will be described in detail below. Equalization module 215 may process the signal Y(m) and the estimated channel frequency response H(m) to eliminate the intersymbol interference (due to multipath nature of the channel), and recover the accurately transmitted signal. The recovered signal at the output of equalization module 215 is labeled as frequency-domain signal S(m). Equalization module may be configured to process its inputs using one or more equalization algorithms. For example, equalization module 215 may be include implementations of a linear equalizer, a decision feedback equalizer, a blind equalizer, a Viterbi equalizer, and/or a turbo equalizer, features and other details of which will be well known to a person of skill in the art. In some embodiments, equalization module 215 is implemented as a linear equalizer, and performs the equalization based on minimum mean square error (MMSE) estimation technique to obtain an estimate of the transmitted signal using the following mathematical operation:

$$S(m) = \frac{Y(m)H^*(m)}{|H(m)|^2 + N(m)}, \quad (1)$$

where N(m) is an estimate (in the frequency domain) of the channel noise. Channel noise N(m) may be estimated using prediction error from module 250 that may be considered as an estimate of noise. In some embodiments, prediction error (or square of amplitude of the prediction error) for each frequency may be averaged over time to get an estimate of noise power in each frequency. In some other embodiments, noise power may be estimated using known preamble data present in the received signal. At the beginning of the operation at system 200, the estimated frequency response H(m) may be initialized (and stored in storage 240c) equal to one, for all values of frequency index m.

The recovered signal S(m) is then converted into time-domain by inputting it to IFFT module 220a that computes an inverse Fourier transform of the signal S(m). The time-domain signal s(n) obtained as an output of IFFT module 220a is then fed as an input to FEC decode and encode module 225, which produces a decision signal d(n). The decision signal d(n) includes multiple time-domain samples each of which represents an accurate estimate of the corresponding sample of the transmitted signal. In some embodiments, FEC decode and encode module 225, for decode operation, is configured to demap equalized data block s(n) with noisy constellation points into corresponding bits, which are then decoded based on the forward error correction (FEC) scheme used in the signal to correct for any bit errors. Further, for encode operation, FEC module 225 re-encode error-corrected decoded bits to create transmitted bit stream. Bits from the created bit stream are then mapped to constellation points to form a more accurate version of s(n), i.e., the decision signal d(n).

In some embodiments, the decision signal d(n) is processed and used (as described in detail below) to obtain an estimate of the current channel frequency response H(m). Typically, in conventional frequency-domain equalizers, instead of using the decision signal d(n) itself, an error value e(n) computed as the difference between the signal s(n) and d(n) (and termed as "decision error"), is used to update the inverse of channel frequency response H(m), i.e., $C_i(m)$, which is used in the equalizer as $S_i(m) = C_i(m)Y_i(m)$. For example, in conventional equalizers, an adaptive algorithm, e.g., the least mean square (LMS) adaptive algorithm, as mathematically represented in equation (2) below, may be used to obtain an estimate of the current inverse channel frequency response $C_i(m)$.

$$C_i(m) = C_{i-1}(m) + \mu Y^*_{i-1}(m) E_{i-1}(m), \quad (2)$$

where the symbol i indicates the data block number, is the step size of the LMS algorithm, $C_{i-1}(m)$ and $Y_{i-1}(m)$ represents inverse channel frequency response and received signal, respectively, associated with the $i-1^{th}$ data block received and processed at system 200, and $E_{i-1}(m)$ is the frequency domain version of the error value e(n) for the $i-1^{th}$ data block obtained by executing a Fourier transform (e.g., using FFT module 210) on e(n). In some embodiments, the number i is assigned to data blocks in the temporal order in which they are received at system 200. Therefore, the indexes i and i-1 associated with any quantity (e.g., C, Y, etc.) may represent temporally-successive values of that quantity.

In contrast to the conventional approaches, in some embodiments of the present disclosure, the decision signal d(n) is used to obtain an estimate of the channel frequency response H(m) (for the next data block, i.e., $i+1^{th}$ data block) as follows. First, the decision signal d(n) is converted into frequency domain using FFT module 220b, and the frequency-domain decision signal D(m) is fed as an input to current channel response-estimation (CCRE) module 230. CCRE module 230 computes an estimate of the current channel frequency response, G(m), i.e., channel frequency response associated with the $i^{th}$ data block, as follows:

$$G_i(m) = \frac{Y_i(m)}{D_i(m)}, \quad (3)$$

In some embodiments, this G(m) estimate computed based on equation (3) above is noisy, and as such, inaccurate. Noise in $G_i(m)$ may be attributed to two possible sources. First, data of $Y_i(m)$ may already be noisy as a result of additive noise present in received data, residual IBI, CP restoration error, etc. Second, noise may be introduced as a result of error in computation of $D_i(m)$. There may be also be an undesired effect of noise enhancement as a result of the division operation in equation (3). For example, for low amplitude constellation points, $D_i(m)$ is relatively small and the noise in $Y_i(m)$ may be amplified as a result of the division operation in equation (3). Accordingly, noise reduction module 235 may be used to reduce or eliminate the noise, and improve the signal-to-noise ratio (SNR) of the $G_i(m)$ estimate. For example, a simple low pass filter may be used to filter out noise in $G_i(m)$. Note that the bandwidth of low-pass filter may need to be defined to enclose the maximum possible channel impulse response length. Such operation of filtering out noise, is may be particularly effective for reducing noise in noise-enhanced frequencies. These narrowband noises are fully spread in time domain, and therefore a significant portion of noise may be removed using low-pass filtering of frequency domain signal $\hat{G}_i(m)$. Other well-known noise-reduction algorithms may be used. The noise-reduced estimate at the output of module 235 is termed as $\hat{G}_i(m)$. It should be noted that $\hat{G}_i(m)$ may not be used for equalization, e.g., in equation (1), and rather may be further stored and processed to obtain the channel frequency response estimate H(m).

For example, the current channel frequency response estimate $\hat{G}_i(m)$ may be stored in channel history memory or storage 240a, which may also be storing estimates $\hat{G}(m)$ for one or more previous or past data blocks. In some embodiments, storage 240a, apart from storing current estimate for block i, may be storing at least six previous channel frequency response estimates $\hat{G}(m)$, i.e., for data blocks numbered i-1 to i-6. The capacity of storage 240a for storing more or less than six channel response estimates may depend on the desired overall performance speed of system 200, availability of type and size of the memory, and other criteria. Although the above description relates to storing channel frequency response estimates of temporally-successive data blocks, storage 240a may be configured to store estimates for randomly-indexed or numbered data blocks, or any combination thereof.

Linear prediction module 245 may be configured to access storage 240a to obtain a plurality of past channel frequency response estimates $\hat{G}(m)$ and perform a linear operation thereon to obtain a predicted current channel frequency response, $\tilde{G}(m)$. For example, module 245 may compute $\tilde{G}(m)$ for current data block i as follows:

$$\tilde{G}_i(m) = \sum_{k=1}^{j} \alpha_k \hat{G}_{i-k}(m), \quad (4)$$

where j denotes the number of past channel frequency responses used (e.g., equal to six), and $\alpha$ denotes a prediction coefficient which may be stored in storage 240b. During the initial phase of the operation of system 200 when all the j values of $\alpha$ and $\hat{G}(m)$ are not yet computed or known, $\alpha_1$ may be initialized equal to one, $\alpha_2$ to $\alpha_j$ values may be initialized equal to zero, and $\hat{G}_{i-1}(m)$ to $\hat{G}_{i-j}(m)$ may be initialized equal to one. The initial values of $\alpha$ and $\hat{G}(m)$ are replaced with their respective updated values in accordance with the operation of system as described herein. In some embodiments, the mean value of the channel frequency response, i.e., mean($\hat{G}(m)$) is held as a stationary component, and only variations from the mean, i.e., $\delta G_i(m)$, are predicted using the equation (4).

Linear prediction module 245 may be further configured to provide the predicted current channel frequency response $\tilde{G}_i(m)$ to prediction error module 250, which may be configured to compute a prediction error value between the estimated current channel frequency response and predicted current channel frequency response as follows:

$$\epsilon(m) = \hat{G}_i(m) - \tilde{G}_i(m) \quad (5)$$

Prediction error module 250 provides the prediction error value $\epsilon(m)$ to predictor update module 255, which may be configured to update the prediction coefficients $\alpha$ using, e.g., an adaptive prediction algorithm, such as normalized LMS algorithm. For example, the process to update the prediction coefficients $\alpha$ at module 255 may be represented mathematically as follows:

$$\hat{\alpha}_k = \alpha_k + \mu \nabla_k, \quad (6)$$

where $\mu$ is the step size, of the normalized LMS algorithm, $\hat{\alpha}_k$ is the updated prediction coefficient, and $\nabla_k$ is the normalized gradient which is computed as follows:

$$\nabla_k = \sum_{m \in Bandwidth} \frac{\epsilon(m)\hat{G}^*_{i-k}(m)}{\sum_{k=1}^{j} |\hat{G}_{i-k}(m)|^2} \quad (7)$$

The updated prediction coefficients $\hat{\alpha}$ from module 255 may be fed to storage 240b to replace the existing prediction coefficients $\alpha$.

In some embodiments, after the updated prediction coefficients are computed, linear prediction module 245 is revisited to compute an estimate of the channel frequency response for the next incoming data block i+1. In other words, module 245 computes a new channel frequency response $H_{i+1}(m)$ to be used by equalization module 215 in equation (1) to recover the transmitted signal as follows:

$$H_{i+1}(m) = \sum_{k=1}^{j} \hat{\alpha}_k \hat{G}_{i-k+1}(m) \quad (8)$$

The new channel frequency response $H_{i+1}(m)$ may be stored in storage 240c to be accessed and used by module 215 and/or IFFT module 220b.

Comparing equations (4) and (8), it can be observed that the plurality of channel frequency responses $\hat{G}(m)$ used to compute the predicted current channel frequency response $\tilde{G}_i(m)$ is different than the plurality of channel frequency responses $\hat{G}(m)$ used to compute the new channel frequency response $H_{i+1}(m)$. For example, in equation (4), values of $\hat{G}(m)$ used therein are indexed as i-k, and in equation (8), the values of $\hat{G}(m)$ used therein are indexed as i-k+1. Accordingly, in some embodiments, both the above pluralities of channel frequency responses include at least one common channel frequency response.

In some embodiments, the same prediction coefficients $\alpha$ may be used for all the frequency components m of the channel response. However, in some other embodiments, the prediction coefficients $\alpha$ are function of the frequency component m. Different sets of prediction coefficients may be used for different frequency bands of the frequency response. For example, the full bandwidth may be divided into L (equal) sub-bands, and a different set of prediction coefficients may be used for each sub-band. If the prediction coefficients for sub-band u are denoted as $\alpha_k^u$ for k=1, ..., j, equations (4), (6), (7), and (8) may be implemented separately for each sub-band u using the particular set of prediction coefficient for that specific sub-band. Equations used to compute a new channel frequency response based on sub-band u are as given below:

$$\tilde{G}_i(m) = \sum_{k=1}^{6} \alpha_k^u \hat{G}_{i-k}(m) \quad (9)$$

$$\hat{\alpha}_k^u = \alpha_k^u - \mu \nabla_k^u$$

$$H_{i-1}(m) = \sum_{k=1}^{6} \hat{\alpha}_k^u \hat{G}_{i-k+1}(m)$$

$$\nabla_k^u = \sum_{m \in Subband\ n} \epsilon(m)\hat{G}^*_{i-k}(m)$$

Although the system operations described above with respect to equations (4)-(9) relate to linear operations, those operations are not restricted only to the above-described computations. As such, other linear and/or non-linear operations may be used.

In addition, various embodiments of this disclosure may be made in hardware, firmware, software, or any suitable combination thereof. Embodiments of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method comprising:
   storing, in a memory, a first plurality of channel frequency responses and a plurality of corresponding predictor coefficients, wherein at least one of the plurality of corresponding predictor coefficients is a direct function of one or more particular frequencies;
   updating, using a processor, at least one of the plurality of corresponding predictor coefficients based on an error value to obtain an updated predictor coefficient for an updated plurality of corresponding predictor coefficients, wherein the error value is computed based on a difference value between an estimated current channel frequency response for a first frequency and a predicted current channel frequency response for the first frequency, wherein the predicted current channel frequency response is computed based on a weighted sum of a plurality of estimated past channel frequency responses for the first frequency; and
   computing, using the processor, a new channel frequency response comprising performing a linear operation on the first plurality of channel frequency responses and the updated plurality of corresponding predictor coefficients.

2. The method of claim 1, further comprising replacing, in the memory, the at least one of the plurality of corresponding predictor coefficients with the updated predictor coefficient.

3. The method of claim 2, wherein said computing operation is executed after said replacing operation.

4. The method of claim 1, wherein said updating the at least one of the plurality of corresponding predictor coefficients is further based on a second plurality of channel frequency responses.

5. The method of claim 4, wherein said updating operation includes implementing an adaptive prediction algorithm on the error value and the second plurality of channel frequency responses.

6. The method of claim 5, wherein the adaptive prediction algorithm includes a normalized least mean square algorithm.

7. The method of claim 6, further comprising computing the predicted current channel frequency response based on the weighted sum of the plurality of corresponding predictor coefficients and the second plurality of channel frequency responses, the second plurality of channel frequency responses comprising the plurality of estimated past channel frequency responses for the first frequency.

8. The method of claim 7, wherein both the first plurality of channel frequency responses and the second plurality of channel frequency responses include at least one common channel frequency response.

9. The method of claim 7, wherein at least one of the first plurality of channel frequency responses or the second plurality of channel frequency responses includes temporally-successive channel frequency responses stored in the memory, each of the temporally-successive channel frequency responses being associated with a corresponding temporally-successively received data block.

10. The method of claim 1, further comprising:
    receiving a modulated signal at a receiver module;
    computing a decision signal using at least an equalization algorithm executed using the received modulated signal; and
    computing the estimated current channel frequency response based on the received modulated signal and the decision signal.

11. The method of claim 10, wherein the modulated signal includes a single-carrier modulated signal, wherein the single-carrier modulated signal includes a signal modulated using at least one of a plurality of single-carrier modulation schemes.

12. The method of claim 11, wherein the plurality of single-carrier modulation schemes includes a vestigial sideband modulation scheme, and a quadrature amplitude modulation scheme.

13. The method of claim 1, wherein the one or more particular frequencies are frequencies of the corresponding channel frequency response.

14. A device comprising:
    a memory storing a first plurality of channel frequency responses and a plurality of corresponding predictor coefficients; and
    a processor configured to implement:
    a prediction error module to compute an error value based on a difference value between an estimated current channel frequency response for a first frequency and a predicted current channel frequency response for the first frequency, wherein the predicted current channel frequency response is computed based on a weighted sum of a plurality of estimated past channel frequency responses for the first frequency;
    a predictor update module to update at least one of the plurality of corresponding predictor coefficients based on the error value to obtain an updated predictor coefficient for an updated plurality of corresponding predictor coefficients; and a linear prediction module to perform a linear operation on the first plurality of channel frequency responses and the updated plurality of corresponding predictor coefficients to compute a new channel frequency response.

15. The device of claim 14, wherein the processor is further configured to implement the predictor update module to update the at least one of the plurality of corresponding predictor coefficients further based on a second plurality of channel frequency responses.

16. The device of claim 15, wherein the memory is further configured to store the second plurality of channel frequency responses, and wherein at least one of the first plurality of channel frequency responses or the second plurality of channel frequency responses includes temporally-successive channel frequency responses, each of the temporally-successive channel frequency responses being associated with a corresponding temporally-successively received data block.

17. The device of claim 15, wherein the processor is further configured to implement:
a receiver module to receive a modulated signal,
an equalization module to execute an equalization algorithm using the received modulated signal to generate an equalized signal,
a decision module to compute a decision signal based on the equalized signal,
a channel response-estimation module to compute the estimated current channel frequency response based on the received modulated signal and the decision signal, and
the linear prediction module to compute the predicted current channel frequency response based on the weighted sum of the plurality of corresponding predictor coefficients and the second plurality of channel frequency responses, the second plurality of channel frequency responses comprising the plurality of estimated past channel frequency responses for the first frequency.

18. The device of claim 14, wherein at least one of the plurality of corresponding predictor coefficients is a function of one or more frequencies of a channel frequency response.

19. A non-transitory computer-readable medium comprising computer-readable instructions, the computer-readable instructions when executed by one or more processors, causes the one or more processors to carry out a plurality of operations comprising:

updating at least one of a plurality of corresponding predictor coefficients based on an error value to obtain an updated predictor coefficient for an updated plurality of corresponding predictor coefficients, wherein the error value is computed based on a difference value between an estimated current channel frequency response for the first frequency and a predicted current channel frequency response for the first frequency, wherein the predicted current channel frequency response is computed based on a weighted sum of a plurality of estimated past channel frequency responses for the first frequency; and
estimating a new channel frequency response comprising performing a linear operation on a first plurality of channel frequency responses and the updated plurality of corresponding predictor coefficients.

20. The non-transitory computer-readable medium of claim 19, wherein said updating the at least one of the plurality of corresponding predictor coefficients is further based on a second plurality of channel frequency responses.

21. The non-transitory computer-readable medium of claim 20, the operations further comprising computing the predicted current channel frequency response based on the weighted sum of the plurality of corresponding predictor coefficients and the second plurality of channel frequency responses, the second plurality of channel frequency responses comprising the plurality of estimated past channel frequency responses for the first frequency.

22. The non-transitory computer-readable medium of claim 19, the operations further comprising:
receiving a modulated signal at a receiver module;
computing a decision signal using at least an equalization algorithm executed using the received modulated signal; and
computing the estimated current channel frequency response based on the received modulated signal and the decision signal.

23. The non-transitory computer-readable medium of claim 19, wherein at least one of the plurality of corresponding predictor coefficients is a function of one or more frequencies of a channel frequency response.

* * * * *